US008904458B2

(12) United States Patent
Kortum et al.

(10) Patent No.: US 8,904,458 B2
(45) Date of Patent: Dec. 2, 2014

(54) SYSTEM AND METHOD FOR PRE-CACHING A FIRST PORTION OF A VIDEO FILE ON A SET-TOP BOX

(75) Inventors: Philip Ted Kortum, Austin, TX (US); Marc Andrew Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1863 days.

(21) Appl. No.: 10/901,921

(22) Filed: Jul. 29, 2004

(65) Prior Publication Data

US 2006/0026663 A1    Feb. 2, 2006

(51) Int. Cl.
| | |
|---|---|
| H04N 7/173 | (2011.01) |
| H04N 7/16 | (2011.01) |
| H04N 21/658 | (2011.01) |
| H04N 21/258 | (2011.01) |
| H04N 21/475 | (2011.01) |
| H04N 21/81 | (2011.01) |

(52) U.S. Cl.
CPC ....... *H04N 21/4755* (2013.01); *H04N 21/6582* (2013.01); *H04N 21/25891* (2013.01); *H04N 21/812* (2013.01); *H04N 7/17318* (2013.01)
USPC ................... 725/93; 725/94; 725/95; 725/96; 725/98; 725/142

(58) Field of Classification Search
USPC .................................................. 725/74–104
See application file for complete search history.

(56) References Cited

U.S. PATENT DOCUMENTS

| | | | |
|---|---|---|---|
| 4,243,147 A | 1/1981 | Twitchell et al. |
| 4,356,509 A | 10/1982 | Skerlos et al. |
| 4,768,926 A | 9/1988 | Gilbert, Jr. |
| 4,907,079 A | 3/1990 | Turner et al. |

(Continued)

FOREIGN PATENT DOCUMENTS

| | | |
|---|---|---|
| WO | WO 99/63759 A2 | 12/1999 |
| WO | WO 00/28689 A2 | 5/2000 |

(Continued)

OTHER PUBLICATIONS

Kapinos, S., "Accenda Universal Remote Control Tartgets Needs of Elderly, Visually Impaired, Physically Challenged . . . and the Rest of Us" Innotech Systems, Inc., Press Release, Port Jefferson, NY, Dec. 15, 2002.

(Continued)

*Primary Examiner* — Mushfikh Alam
(74) *Attorney, Agent, or Firm* — Tolar Law Group, PC

(57) ABSTRACT

A method of pre-caching video content is provided and includes measuring an available bandwidth of a data connection to a set top box. The available bandwidth measurement can be an average available bandwidth of the data connection to the set top box or a minimum available bandwidth of the data connection to the set top box. Each of a plurality of video files is divided into a first portion and a second portion and the size of each first portion is based on the available bandwidth measurement. The first portion of each of the plurality of video files is downloaded over the data connection and stored in a memory within the set top box. A list is displayed at a display device and includes a list of video titles that correspond to the plurality of video files that have only a first portion downloaded to the memory.

33 Claims, 3 Drawing Sheets

(56) References Cited

U.S. PATENT DOCUMENTS

| | | | |
|---|---|---|---|
| 5,126,731 A | 6/1992 | Cromer, Jr. et al. |
| 5,163,340 A | 11/1992 | Bender |
| 5,463,422 A | 10/1995 | Simpson et al. |
| 5,475,835 A | 12/1995 | Hickey |
| 5,532,748 A | 7/1996 | Naimpally |
| 5,541,917 A | 7/1996 | Farris |
| 5,568,181 A | 10/1996 | Greenwood et al. |
| 5,589,892 A | 12/1996 | Knee et al. |
| 5,592,477 A | 1/1997 | Farris et al. |
| 5,610,916 A | 3/1997 | Kostreski et al. |
| 5,613,012 A | 3/1997 | Hoffman et al. |
| 5,650,831 A | 7/1997 | Farwell |
| 5,651,332 A | 7/1997 | Moore et al. |
| 5,656,898 A | 8/1997 | Kalina |
| 5,675,390 A | 10/1997 | Schindler et al. |
| 5,708,961 A | 1/1998 | Hylton et al. |
| 5,722,041 A | 2/1998 | Freadman |
| 5,724,106 A | 3/1998 | Autry et al. |
| 5,729,825 A | 3/1998 | Kostreski et al. |
| 5,734,853 A | 3/1998 | Hendricks et al. |
| 5,774,357 A | 6/1998 | Hoffberg et al. |
| 5,793,438 A | 8/1998 | Bedard |
| 5,805,719 A | 9/1998 | Pare, Jr. et al. |
| 5,818,438 A | 10/1998 | Howe et al. |
| 5,822,530 A | 10/1998 | Brown |
| 5,838,384 A | 11/1998 | Schindler et al. |
| 5,838,812 A | 11/1998 | Pare, Jr. et al. |
| 5,864,757 A | 1/1999 | Parker |
| 5,867,223 A | 2/1999 | Schindler et al. |
| 5,892,508 A | 4/1999 | Howe et al. |
| 5,900,867 A | 5/1999 | Schindler et al. |
| 5,910,970 A | 6/1999 | Lu |
| 5,933,498 A | 8/1999 | Schneck et al. |
| 5,953,318 A | 9/1999 | Nattkemper et al. |
| 5,956,024 A | 9/1999 | Strickland et al. |
| 5,956,716 A | 9/1999 | Kenner et al. |
| 5,970,088 A | 10/1999 | Chen |
| 5,987,061 A | 11/1999 | Chen |
| 5,990,927 A | 11/1999 | Hendricks et al. |
| 5,995,155 A | 11/1999 | Schindler et al. |
| 5,999,518 A | 12/1999 | Nattkemper et al. |
| 5,999,563 A | 12/1999 | Polley et al. |
| 6,002,722 A | 12/1999 | Wu |
| 6,014,184 A | 1/2000 | Knee et al. |
| 6,018,359 A * | 1/2000 | Kermode et al. ............. 725/101 |
| 6,021,158 A | 2/2000 | Schurr et al. |
| 6,021,167 A | 2/2000 | Wu |
| 6,028,600 A | 2/2000 | Rosin et al. |
| 6,029,045 A | 2/2000 | Picco et al. |
| 6,038,251 A | 3/2000 | Chen |
| 6,044,107 A | 3/2000 | Gatherer et al. |
| 6,052,120 A | 4/2000 | Nahi et al. |
| 6,055,268 A | 4/2000 | Timm et al. |
| 6,072,483 A | 6/2000 | Rosin et al. |
| 6,084,584 A | 7/2000 | Nahi et al. |
| 6,111,582 A | 8/2000 | Jenkins |
| 6,118,498 A | 9/2000 | Reitmeier |
| 6,122,660 A | 9/2000 | Baransky et al. |
| 6,124,799 A | 9/2000 | Parker |
| 6,137,839 A | 10/2000 | Mannering et al. |
| 6,166,734 A | 12/2000 | Nahi et al. |
| 6,181,335 B1 | 1/2001 | Hendricks et al. |
| 6,192,282 B1 | 2/2001 | Smith et al. |
| 6,195,692 B1 | 2/2001 | Hsu |
| 6,215,483 B1 | 4/2001 | Zigmond |
| 6,237,022 B1 | 5/2001 | Bruck et al. |
| 6,243,366 B1 | 6/2001 | Bradley et al. |
| 6,252,588 B1 | 6/2001 | Dawson |
| 6,252,989 B1 | 6/2001 | Geisler et al. |
| 6,260,192 B1 | 7/2001 | Rosin et al. |
| 6,269,394 B1 | 7/2001 | Kenner et al. |
| 6,275,268 B1 | 8/2001 | Ellis et al. |
| 6,275,989 B1 | 8/2001 | Broadwin et al. |
| 6,281,813 B1 | 8/2001 | Vierthaler et al. |
| 6,286,142 B1 | 9/2001 | Ehreth |
| 6,295,057 B1 | 9/2001 | Rosin et al. |
| 6,311,214 B1 | 10/2001 | Rhoads |
| 6,314,409 B2 | 11/2001 | Schneck et al. |
| 6,344,882 B1 | 2/2002 | Shim et al. |
| 6,357,043 B1 | 3/2002 | Ellis et al. |
| 6,359,636 B1 | 3/2002 | Schindler et al. |
| 6,363,149 B1 | 3/2002 | Candelore |
| 6,385,693 B1 | 5/2002 | Gerszberg et al. |
| 6,396,480 B1 | 5/2002 | Schindler et al. |
| 6,396,531 B1 | 5/2002 | Gerszberg et al. |
| 6,396,544 B1 | 5/2002 | Schindler et al. |
| 6,397,387 B1 | 5/2002 | Rosin et al. |
| 6,400,407 B1 | 6/2002 | Zigmond et al. |
| 6,411,307 B1 | 6/2002 | Rosin et al. |
| 6,442,285 B2 | 8/2002 | Rhoads et al. |
| 6,442,549 B1 | 8/2002 | Schneider |
| 6,449,601 B1 | 9/2002 | Friedland et al. |
| 6,450,407 B1 | 9/2002 | Freeman et al. |
| 6,460,075 B2 | 10/2002 | Krueger et al. |
| 6,463,585 B1 | 10/2002 | Hendricks et al. |
| 6,481,011 B1 | 11/2002 | Lemmons |
| 6,486,892 B1 | 11/2002 | Stern |
| 6,492,913 B2 | 12/2002 | Vierthaler et al. |
| 6,496,983 B1 | 12/2002 | Schindler et al. |
| 6,502,242 B1 | 12/2002 | Howe et al. |
| 6,505,348 B1 | 1/2003 | Knowles et al. |
| 6,510,519 B2 | 1/2003 | Wasilewski et al. |
| 6,515,680 B1 | 2/2003 | Hendricks et al. |
| 6,516,467 B1 | 2/2003 | Schindler et al. |
| 6,519,011 B1 | 2/2003 | Shendar |
| 6,522,769 B1 | 2/2003 | Rhoads et al. |
| 6,526,577 B1 | 2/2003 | Knudson et al. |
| 6,529,949 B1 | 3/2003 | Getsin et al. |
| 6,535,590 B2 | 3/2003 | Tidwell et al. |
| 6,538,704 B1 | 3/2003 | Grabb et al. |
| 6,542,740 B1 | 4/2003 | Olgaard et al. |
| 6,557,030 B1 | 4/2003 | Hoang |
| 6,567,982 B1 | 5/2003 | Howe et al. |
| 6,587,873 B1 | 7/2003 | Nobakht et al. |
| 6,598,231 B1 | 7/2003 | Basawapatna et al. |
| 6,599,199 B1 | 7/2003 | Hapshie |
| 6,607,136 B1 | 8/2003 | Atsmon et al. |
| 6,609,253 B1 | 8/2003 | Swix et al. |
| 6,611,537 B1 | 8/2003 | Edens et al. |
| 6,614,987 B1 | 9/2003 | Ismail et al. |
| 6,622,148 B1 | 9/2003 | Noble et al. |
| 6,622,307 B1 | 9/2003 | Ho |
| 6,631,523 B1 | 10/2003 | Matthews, III et al. |
| 6,640,239 B1 | 10/2003 | Gidwani |
| 6,643,495 B1 | 11/2003 | Gallery et al. |
| 6,643,684 B1 | 11/2003 | Malkin et al. |
| 6,650,761 B1 | 11/2003 | Rodriguez et al. |
| 6,658,568 B1 | 12/2003 | Ginter et al. |
| 6,668,377 B1 | 12/2003 | Dunn |
| 6,678,215 B1 | 1/2004 | Treyz et al. |
| 6,678,733 B1 | 1/2004 | Brown et al. |
| 6,690,392 B1 | 2/2004 | Wugoski |
| 6,693,236 B1 | 2/2004 | Gould et al. |
| 6,701,523 B1 | 3/2004 | Hancock et al. |
| 6,701,528 B1 * | 3/2004 | Arsenault et al. ............. 725/89 |
| 6,704,931 B1 | 3/2004 | Schaffer et al. |
| 6,714,264 B1 | 3/2004 | Kempisty |
| 6,725,281 B1 | 4/2004 | Zintel et al. |
| 6,731,393 B1 | 5/2004 | Currans et al. |
| 6,732,179 B1 | 5/2004 | Brown et al. |
| 6,745,223 B1 | 6/2004 | Nobakht et al. |
| 6,745,392 B1 | 6/2004 | Basawapatna et al. |
| 6,754,206 B1 | 6/2004 | Nattkemper et al. |
| 6,756,997 B1 | 6/2004 | Ward, III et al. |
| 6,760,918 B2 | 7/2004 | Rodriguez et al. |
| 6,763,226 B1 | 7/2004 | McZeal, Jr. |
| 6,765,557 B1 | 7/2004 | Segal et al. |
| 6,766,305 B1 | 7/2004 | Fucarile et al. |
| 6,769,128 B1 | 7/2004 | Knee et al. |
| 6,771,317 B2 | 8/2004 | Ellis et al. |
| 6,773,344 B1 | 8/2004 | Gabai et al. |
| 6,778,559 B2 | 8/2004 | Hyakutake |
| 6,779,004 B1 | 8/2004 | Zintel |
| 6,781,518 B1 | 8/2004 | Hayes et al. |

(56) References Cited

U.S. PATENT DOCUMENTS

| | | | |
|---|---|---|---|
| 6,784,804 B1 | 8/2004 | Hayes et al. | |
| 6,785,716 B1 | 8/2004 | Nobakht | |
| 6,788,709 B1 | 9/2004 | Hyakutake | |
| 6,804,824 B1 | 10/2004 | Potrebic et al. | |
| 6,826,775 B1 | 11/2004 | Howe et al. | |
| 6,828,993 B1 | 12/2004 | Hendricks et al. | |
| 6,909,874 B2 | 6/2005 | Holtz et al. | |
| 6,912,612 B2 * | 6/2005 | Kapur et al. | 710/309 |
| 6,938,021 B2 | 8/2005 | Shear et al. | |
| 6,988,278 B2 * | 1/2006 | Gomez | 725/101 |
| 7,024,679 B1 * | 4/2006 | Sie et al. | 725/101 |
| 7,143,433 B1 * | 11/2006 | Duan et al. | 725/115 |
| 7,203,952 B2 * | 4/2007 | Broadus | 725/40 |
| 7,237,032 B2 * | 6/2007 | Gemmell | 709/231 |
| 8,171,123 B2 | 5/2012 | Takeda et al. | |
| 8,584,183 B2 * | 11/2013 | Arsenault et al. | 725/89 |
| 8,701,148 B2 | 4/2014 | Weaver et al. | |
| 8,701,178 B2 | 4/2014 | Suh et al. | |
| 2001/0011261 A1 | 8/2001 | Mullen-Schultz | |
| 2001/0016945 A1 | 8/2001 | Inoue | |
| 2001/0016946 A1 | 8/2001 | Inoue | |
| 2001/0034664 A1 | 10/2001 | Brunson | |
| 2001/0044794 A1 | 11/2001 | Nasr et al. | |
| 2001/0048677 A1 | 12/2001 | Boys | |
| 2001/0049826 A1 | 12/2001 | Wilf | |
| 2001/0054008 A1 | 12/2001 | Miller et al. | |
| 2001/0054009 A1 | 12/2001 | Miller et al. | |
| 2001/0054067 A1 | 12/2001 | Miller et al. | |
| 2001/0056350 A1 | 12/2001 | Calderone et al. | |
| 2002/0001303 A1 | 1/2002 | Boys | |
| 2002/0001310 A1 | 1/2002 | Mai et al. | |
| 2002/0002496 A1 | 1/2002 | Miller et al. | |
| 2002/0003166 A1 | 1/2002 | Miller et al. | |
| 2002/0007307 A1 | 1/2002 | Miller et al. | |
| 2002/0007313 A1 | 1/2002 | Mai et al. | |
| 2002/0007485 A1 | 1/2002 | Rodriguez et al. | |
| 2002/0010639 A1 | 1/2002 | Howey et al. | |
| 2002/0010745 A1 | 1/2002 | Schneider | |
| 2002/0010935 A1 | 1/2002 | Sitnik | |
| 2002/0016736 A1 | 2/2002 | Cannon et al. | |
| 2002/0022963 A1 | 2/2002 | Miller et al. | |
| 2002/0022970 A1 | 2/2002 | Noll et al. | |
| 2002/0022992 A1 | 2/2002 | Miller et al. | |
| 2002/0022993 A1 | 2/2002 | Miller et al. | |
| 2002/0022994 A1 | 2/2002 | Miller et al. | |
| 2002/0022995 A1 | 2/2002 | Miller et al. | |
| 2002/0023959 A1 | 2/2002 | Miller et al. | |
| 2002/0026357 A1 | 2/2002 | Miller et al. | |
| 2002/0026358 A1 | 2/2002 | Miller et al. | |
| 2002/0026369 A1 | 2/2002 | Miller et al. | |
| 2002/0026475 A1 | 2/2002 | Marmor | |
| 2002/0029181 A1 | 3/2002 | Miller et al. | |
| 2002/0030105 A1 | 3/2002 | Miller et al. | |
| 2002/0032603 A1 | 3/2002 | Yeiser | |
| 2002/0035404 A1 | 3/2002 | Ficco et al. | |
| 2002/0040475 A1 | 4/2002 | Yap et al. | |
| 2002/0042915 A1 | 4/2002 | Kubischta et al. | |
| 2002/0046093 A1 | 4/2002 | Miller et al. | |
| 2002/0049635 A1 | 4/2002 | Mai et al. | |
| 2002/0049971 A1 | 4/2002 | Augenbraun et al. | |
| 2002/0054087 A1 | 5/2002 | Noll et al. | |
| 2002/0054750 A1 | 5/2002 | Ficco et al. | |
| 2002/0059163 A1 | 5/2002 | Smith | |
| 2002/0059425 A1 | 5/2002 | Belfiore et al. | |
| 2002/0059599 A1 | 5/2002 | Schein et al. | |
| 2002/0065717 A1 | 5/2002 | Miller et al. | |
| 2002/0067438 A1 | 6/2002 | Baldock | |
| 2002/0069220 A1 | 6/2002 | Tran | |
| 2002/0069282 A1 | 6/2002 | Reisman | |
| 2002/0069294 A1 | 6/2002 | Herkersdorf et al. | |
| 2002/0072970 A1 | 6/2002 | Miller et al. | |
| 2002/0078442 A1 | 6/2002 | Reyes et al. | |
| 2002/0087995 A1 * | 7/2002 | Pedlow, Jr. | 725/87 |
| 2002/0097261 A1 | 7/2002 | Gottfurcht et al. | |
| 2002/0106119 A1 | 8/2002 | Foran et al. | |
| 2002/0112239 A1 | 8/2002 | Goldman | |
| 2002/0116392 A1 | 8/2002 | McGrath et al. | |
| 2002/0124055 A1 | 9/2002 | Reisman | |
| 2002/0128061 A1 | 9/2002 | Blanco | |
| 2002/0129094 A1 | 9/2002 | Reisman | |
| 2002/0133402 A1 | 9/2002 | Faber et al. | |
| 2002/0133830 A1 | 9/2002 | Kim et al. | |
| 2002/0136298 A1 | 9/2002 | Anantharamu et al. | |
| 2002/0138840 A1 | 9/2002 | Schein et al. | |
| 2002/0152264 A1 | 10/2002 | Yamasaki | |
| 2002/0169611 A1 | 11/2002 | Guerra et al. | |
| 2002/0170063 A1 | 11/2002 | Ansari et al. | |
| 2002/0173344 A1 | 11/2002 | Cupps et al. | |
| 2002/0174438 A1 | 11/2002 | Cleary et al. | |
| 2002/0188955 A1 | 12/2002 | Thompson et al. | |
| 2002/0193997 A1 | 12/2002 | Fitzpatrick et al. | |
| 2002/0194601 A1 | 12/2002 | Perkes et al. | |
| 2002/0194612 A1 * | 12/2002 | Lundberg et al. | 725/115 |
| 2002/0198874 A1 | 12/2002 | Nasr et al. | |
| 2003/0005445 A1 | 1/2003 | Schein et al. | |
| 2003/0005454 A1 | 1/2003 | Rodriguez et al. | |
| 2003/0009771 A1 | 1/2003 | Chang | |
| 2003/0012365 A1 | 1/2003 | Goodman | |
| 2003/0014750 A1 | 1/2003 | Kamen | |
| 2003/0018975 A1 | 1/2003 | Stone | |
| 2003/0023435 A1 | 1/2003 | Josephson | |
| 2003/0023440 A1 | 1/2003 | Chu | |
| 2003/0028890 A1 | 2/2003 | Swart et al. | |
| 2003/0033416 A1 | 2/2003 | Schwartz | |
| 2003/0043915 A1 | 3/2003 | Costa et al. | |
| 2003/0046091 A1 | 3/2003 | Arneson et al. | |
| 2003/0046689 A1 | 3/2003 | Gaos | |
| 2003/0056223 A1 | 3/2003 | Costa et al. | |
| 2003/0058277 A1 | 3/2003 | Bowman-Amuah | |
| 2003/0061611 A1 | 3/2003 | Pendakur | |
| 2003/0061619 A1 | 3/2003 | Giammaressi | |
| 2003/0071792 A1 | 4/2003 | Safadi | |
| 2003/0093793 A1 | 5/2003 | Gutta | |
| 2003/0100340 A1 | 5/2003 | Cupps et al. | |
| 2003/0110161 A1 | 6/2003 | Schneider | |
| 2003/0110503 A1 | 6/2003 | Perkes | |
| 2003/0126136 A1 | 7/2003 | Omoigui | |
| 2003/0135771 A1 | 7/2003 | Cupps et al. | |
| 2003/0141987 A1 | 7/2003 | Hayes | |
| 2003/0145321 A1 | 7/2003 | Bates et al. | |
| 2003/0149989 A1 | 8/2003 | Hunter et al. | |
| 2003/0153353 A1 | 8/2003 | Cupps et al. | |
| 2003/0153354 A1 | 8/2003 | Cupps et al. | |
| 2003/0159026 A1 | 8/2003 | Cupps et al. | |
| 2003/0160830 A1 | 8/2003 | DeGross | |
| 2003/0163601 A1 | 8/2003 | Cupps et al. | |
| 2003/0163666 A1 | 8/2003 | Cupps et al. | |
| 2003/0172380 A1 | 9/2003 | Kikinis | |
| 2003/0182237 A1 | 9/2003 | Costa et al. | |
| 2003/0182420 A1 | 9/2003 | Jones et al. | |
| 2003/0185232 A1 | 10/2003 | Moore et al. | |
| 2003/0187641 A1 | 10/2003 | Moore et al. | |
| 2003/0187646 A1 | 10/2003 | Smyers et al. | |
| 2003/0187800 A1 | 10/2003 | Moore et al. | |
| 2003/0188318 A1 * | 10/2003 | Liew et al. | 725/93 |
| 2003/0189509 A1 | 10/2003 | Hayes et al. | |
| 2003/0189589 A1 | 10/2003 | LeBlanc et al. | |
| 2003/0194141 A1 | 10/2003 | Kortum et al. | |
| 2003/0194142 A1 | 10/2003 | Kortum et al. | |
| 2003/0208396 A1 | 11/2003 | Miller et al. | |
| 2003/0208758 A1 | 11/2003 | Schein et al. | |
| 2003/0226044 A1 | 12/2003 | T. Cupps et al. | |
| 2003/0226145 A1 | 12/2003 | Marsh | |
| 2003/0229900 A1 | 12/2003 | Reisman | |
| 2004/0003041 A1 | 1/2004 | Moore et al. | |
| 2004/0003403 A1 | 1/2004 | Marsh | |
| 2004/0006769 A1 | 1/2004 | Ansari et al. | |
| 2004/0006772 A1 | 1/2004 | Ansari et al. | |
| 2004/0010602 A1 | 1/2004 | Van Vleck et al. | |
| 2004/0015997 A1 | 1/2004 | Ansari et al. | |
| 2004/0016000 A1 * | 1/2004 | Zhang et al. | 725/143 |
| 2004/0030750 A1 | 2/2004 | Moore et al. | |
| 2004/0031058 A1 | 2/2004 | Reisman | |
| 2004/0031856 A1 | 2/2004 | Atsmon et al. | |

(56) References Cited

U.S. PATENT DOCUMENTS

| | | |
|---|---|---|
| 2004/0034877 A1 | 2/2004 | Nogues |
| 2004/0049728 A1 | 3/2004 | Langford |
| 2004/0064351 A1 | 4/2004 | Mikurak |
| 2004/0068740 A1 | 4/2004 | Fukuda et al. |
| 2004/0068753 A1 | 4/2004 | Robertson et al. |
| 2004/0070491 A1 | 4/2004 | Huang et al. |
| 2004/0073918 A1 | 4/2004 | Ferman et al. |
| 2004/0098571 A1 | 5/2004 | Falcon |
| 2004/0107125 A1 | 6/2004 | Guheen et al. |
| 2004/0107439 A1 | 6/2004 | Hassell et al. |
| 2004/0111745 A1 | 6/2004 | Schein et al. |
| 2004/0111756 A1 | 6/2004 | Stuckman et al. |
| 2004/0117813 A1 | 6/2004 | Karaoguz et al. |
| 2004/0117824 A1 | 6/2004 | Karaoguz et al. |
| 2004/0128342 A1 | 7/2004 | Maes et al. |
| 2004/0139173 A1 | 7/2004 | Karaoguz et al. |
| 2004/0143600 A1 | 7/2004 | Musgrove et al. |
| 2004/0143652 A1 | 7/2004 | Grannan et al. |
| 2004/0148408 A1 | 7/2004 | Nadarajah |
| 2004/0150676 A1 | 8/2004 | Gottfurcht et al. |
| 2004/0183839 A1 | 9/2004 | Gottfurcht et al. |
| 2004/0194136 A1 | 9/2004 | Finseth et al. |
| 2004/0198386 A1 | 10/2004 | Dupray |
| 2004/0201600 A1 | 10/2004 | Kakivaya et al. |
| 2004/0210633 A1 | 10/2004 | Brown et al. |
| 2004/0210935 A1 | 10/2004 | Schein et al. |
| 2004/0213271 A1 | 10/2004 | Lovy et al. |
| 2004/0221302 A1 | 11/2004 | Ansari et al. |
| 2004/0223485 A1 | 11/2004 | Arellano et al. |
| 2004/0226035 A1 | 11/2004 | Hauser, Jr. |
| 2004/0226045 A1 | 11/2004 | Nadarajah |
| 2004/0239624 A1 | 12/2004 | Ramian |
| 2004/0252119 A1 | 12/2004 | Hunleth et al. |
| 2004/0252120 A1 | 12/2004 | Hunleth et al. |
| 2004/0252769 A1 | 12/2004 | Costa et al. |
| 2004/0252770 A1 | 12/2004 | Costa et al. |
| 2004/0260407 A1 | 12/2004 | Wimsatt |
| 2004/0261116 A1 | 12/2004 | McKeown et al. |
| 2004/0267729 A1 | 12/2004 | Swaminathan et al. |
| 2004/0268393 A1 | 12/2004 | Hunleth et al. |
| 2005/0027851 A1 | 2/2005 | McKeown et al. |
| 2005/0038814 A1 | 2/2005 | Iyengar et al. |
| 2005/0044280 A1 | 2/2005 | Reisman |
| 2005/0097612 A1 | 5/2005 | Pearson et al. |
| 2005/0132295 A1 | 6/2005 | Noll et al. |
| 2005/0195961 A1 | 9/2005 | Pasquale et al. |
| 2006/0026663 A1 | 2/2006 | Kortum et al. |
| 2010/0115566 A1 | 5/2010 | Haimi-Cohen |

FOREIGN PATENT DOCUMENTS

| | | |
|---|---|---|
| WO | WO 01/60066 AI | 8/2001 |
| WO | WO 02/17627 A2 | 2/2002 |
| WO | WO 02/058382 A1 | 7/2002 |
| WO | WO 03/003710 A2 | 1/2003 |
| WO | WO 03/025726 A1 | 3/2003 |
| WO | WO 2004/018060 A2 | 3/2004 |
| WO | WO 2004/032514 A1 | 4/2004 |
| WO | WO 2004/062279 A1 | 7/2004 |
| WO | WO 2005/045554 A2 | 5/2005 |

OTHER PUBLICATIONS

U.S. Appl. No. 10/752,301, filed Jan. 6, 2004.
U.S. Appl. No. 11/158,926, filed Jun. 22, 2005.
U.S. Appl. No. 10/929,888, filed Aug. 26, 2004.
U.S. Appl. No. 10/915,684, filed Aug. 10, 2004.
U.S. Appl. No. 10/960,771, filed Oct. 7, 2004.
U.S. Appl. No. 11/148,967, filed Jun. 9, 2005.
U.S. Appl. No. 10/915,683, filed Aug. 10, 2004.
U.S. Appl. No. 11/001,676, filed Dec. 1, 2004.
U.S. Appl. No. 10/993,411, filed Nov. 19, 2004.
U.S. Appl. No. 11/179,048, filed Jul. 11, 2005.
U.S. Appl. No. 11/001,683, filed Dec. 1, 2004.
U.S. Appl. No. 11/005,496, filed Dec. 6, 2004.
U.S. Appl. No. 11/049,629, filed Feb. 2, 2005.
U.S. Appl. No. 11/043,443, filed Jan. 26, 2005.
U.S. Appl. No. 11/057,858, filed Feb. 14, 2005.
U.S. Appl. No. 11/064,775, filed Feb. 24, 2005.
U.S. Appl. No. 11/140,616, filed May 27, 2005.
U.S. Appl. No. 11/057,859, filed Feb. 14, 2005.
U.S. Appl. No. 11/093,736, filed Mar. 30, 2005.
U.S. Appl. No. 11/191,154, filed Jul. 27, 2005.
U.S. Appl. No. 11/158,892, filed Jun. 22, 2005.
U.S. Appl. No. 11/106,361, filed Apr. 14, 2005.
U.S. Appl. No. 11/158,927, filed Jun. 22, 2005.
U.S. Appl. No. 10/696,395, filed Oct. 29, 2003.
U.S. Appl. No. 11/077,167, filed Mar. 10, 2005.
U.S. Appl. No. 11/034,223, filed Jan. 12, 2005.
U.S. Appl. No. 11/051,553, filed Feb. 4, 2005.
U.S. Appl. No. 11/046,191, filed Jan. 28, 2005.
U.S. Appl. No. 11/052,006, filed Feb. 4, 2005.
U.S. Appl. No. 11/039,063, filed Jan. 20, 2005.
U.S. Appl. No. 11/037,951, filed Jan. 20, 2005.
U.S. Appl. No. 11/166,785, filed Jun. 24, 2005.
U.S. Appl. No. 11/166,908, filed Jun. 24, 2005.
U.S. Appl. No. 11/166,907, filed Jun. 24, 2005.
International Search Report and Written Opinion of the International Searching Authority, issued on Jan. 24, 2007 for International Application No. PCT/US05/24854, 6 pages.

* cited by examiner

SYSTEM AND METHOD FOR PRE-CACHING A FIRST PORTION OF A VIDEO FILE ON A SET-TOP BOX

FIELD OF THE INVENTION

The present disclosure relates generally to set top boxes.

BACKGROUND

For years, televisions have been a staple of consumer electronics sales. As such, a large majority of households in the United States owns at least one television. Providing content to those televisions is a lucrative business and there are numerous types of television content to choose from. For example, viewers can subscribe to digital broadband television networks and digital satellite television networks in order to receive standard digital television content or high definition television content via a broadband connection or a satellite connection. In addition, many companies now offer digital video recorders (DVRs) that can be incorporated into standard set top boxes. A DVR can be used to record digital television content transmitted to the set top box.

Many service providers also offer streaming video content and pre-cache video content in order to provide a user with content that is tailored to his or her needs or tastes. Unfortunately, streaming video content systems and pre-cache video content systems have limitations. For example, in a streaming video content system, the set top box builds up a buffer of the streaming video before video content can be displayed. The buffer is provided in order to account for variations in the download performance of the network. Depending on the available bandwidth and the level at which the content is encoded, the caching phase of the streaming video content can take more than several hours.

With pre-cache video content systems, video files are stored in their entirety on the set top box in anticipation of a user wishing to download one or more of the video files. A pre-cache video content system eliminates the wait, but due to the relatively large sizes of the video files, only a limited number of movies can be pre-cached on the set top box, e.g., five to fifteen video files. As such, if a customer is not interested in one or more of the pre-cached video files, he or she must wait for the entire video file to be downloaded.

Accordingly, there is a need for an improved system and method for pre-caching video files on a set top box.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Figure 1:
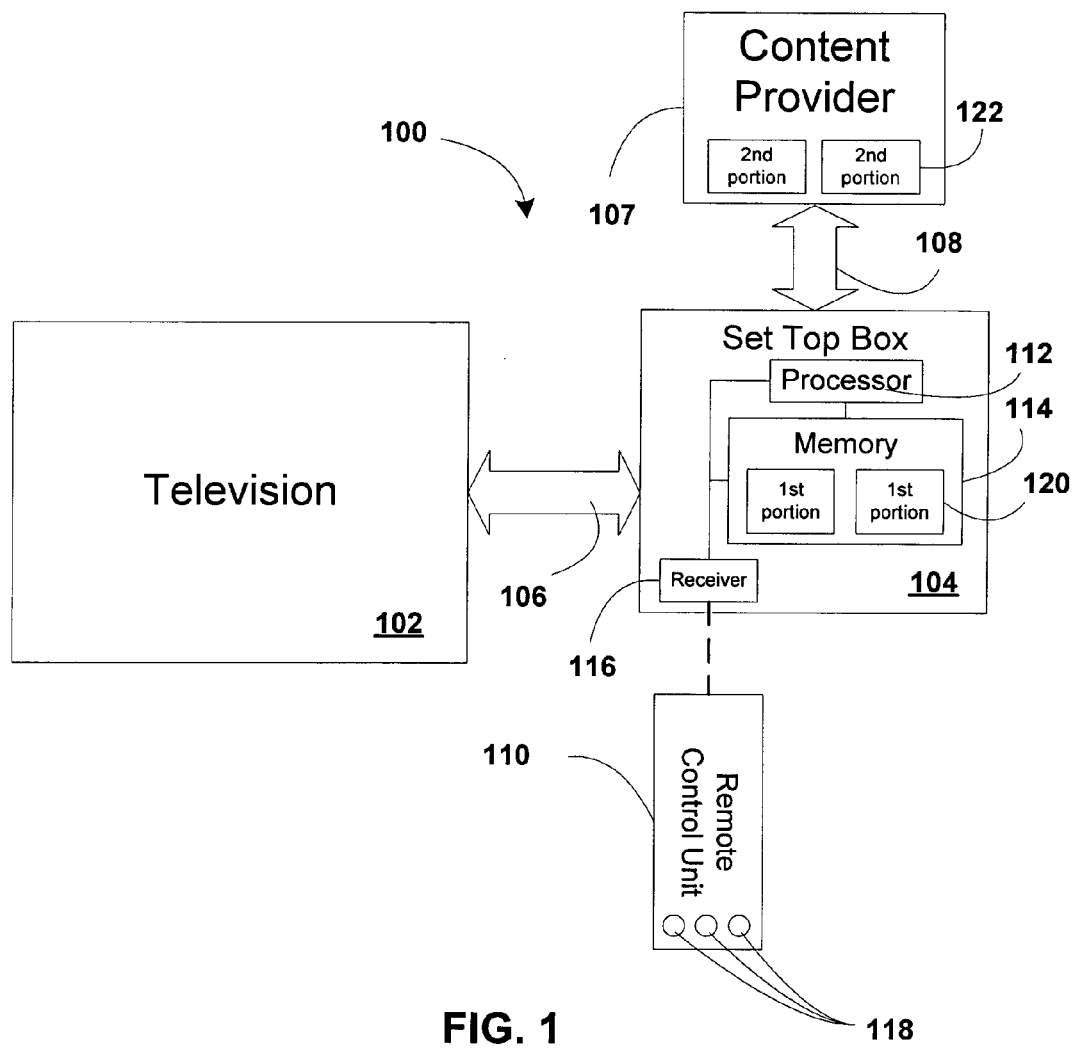
FIG. 1 is a block diagram that is representative of an entertainment system.

A method of pre-caching video content is provided and includes measuring an available bandwidth of a data connection to a set top box. In one embodiment, the available bandwidth measurement is an average available bandwidth of the data connection to the set top box. However, the available bandwidth measurement can be a minimum available bandwidth of the data connection to the set top box. Each of a plurality of video files is divided into a first portion and a second portion and the size of each first portion is based on the available bandwidth measurement. The first portion of each of the plurality of video files is downloaded over the data connection. Also, the first portion of each of the plurality of video files is stored in a memory within the set top box. A list is displayed at a display device and includes a list of video titles that correspond to the plurality of video files that have only a first portion downloaded to the memory.

In an illustrative embodiment, the total number of video titles on the list is determined at least partially based on the available bandwidth measurement. Moreover, when a user selection of a video title is detected, the first portion of a video file is accessed from memory and corresponds to the video title selected by the user. Then, the first portion of the video file can be displayed at the display device. The method further includes downloading a second portion of the video file over the data connection while the first portion is being displayed at the display device. The second portion of the video file can be displayed after the first portion has been displayed.

In another embodiment, a device is provided for managing video content. The device includes a processor and a computer-readable memory accessible to the processor. The computer readable-memory includes an available bandwidth measurement of a data connection to the device and a list of video titles. Each video title on the list corresponds to a first portion of a video file that is available immediately at the device and a second portion of the video file that is downloadable to the device but stored remotely from the device.

In still another embodiment, a system for managing video content is provided and includes a display device. A set top box is coupled to the display device and includes a data interface to a remote video content source. The set top box includes a processor, and a computer-readable medium accessible by the processor. A program is embedded in the computer-readable medium. The program includes instructions to measure an available bandwidth of the data interface to the set top box. Further, the program includes instructions to receive a first portion of each of a plurality of video files and store the first portion of each of the plurality of video files in a memory within the set top box. The size of the memory to store each first portion is at least partially determined based on the available bandwidth measurement. The program also includes instructions to display a list of video titles at the display device. Each video title on the list represents a video file that has the first portion stored in the memory of the set top box and a second portion that is downloadable to the memory while the first portion is displayed at the display device.

In yet another embodiment, a method of pre-caching video content includes determining a first available bandwidth measurement of a data connection to a set top box. A memory area is allocated for storing a first portion of a video file that is to be downloaded to the memory area. The size of the memory area is partially based on the first available bandwidth measurement. A second available bandwidth measurement of the data connection to the set top box can be determined. Moreover, the size of the memory area for storing the first portion can be adjusted based on the second available bandwidth measurement.

In yet still another embodiment, a method for handling video content includes deploying a set top box at a designated location. The set top box is connected to a data interface and activated. A first available bandwidth measurement of the data interface is determined. A segment of a memory within the set top box is apportioned. The size of the segment of the memory is based on the first available bandwidth measurement. Also, the segment of the memory is configured to store a first portion of each of a plurality of video files. A second portion of each of the plurality of video files is downloadable to the set top box via the data interface.

Referring to FIG. 1, a system for managing movies and video files for display at a television is illustrated and is generally designated 100. As illustrated in FIG. 1, in an exemplary, non-limiting embodiment, the system 100 includes a television 102, but it can be appreciated that the system 100 can include any display device on which video content can be displayed. FIG. 1 indicates that a set top box 104 can be connected to the television 102 via a first data connection or interface 106. The set top box 104 is also connected to a video content provider, e.g., a cable company or a digital satellite company, via a second data connection or interface 108. FIG. 1 also depicts a remote control unit 110 that can communicate with the set top box 104 to allow user interaction with the system 100 during operation. The remote control unit 110 can communicate with the set top box 104 via one or more infrared (IR) signals, or other wireless signals.

As indicated in FIG. 1, the set top box 104 includes a processor 112 in which logic, such as user interface logic, can be executed. Further, the set top box 104 includes a memory 114 in which content from the content provider can be downloaded and stored. FIG. 1 also shows that the set top box 104 can include a receiver 116, e.g., an IR receiver, that is configured to receive one or more IR signals from the remote control unit 110. Moreover, as depicted in FIG. 1, the remote control unit 110 can include a plurality of buttons 118 that can be toggled by a user during operation, e.g., in order to request one or more video files to be downloaded from the content provider.

Figure 2:
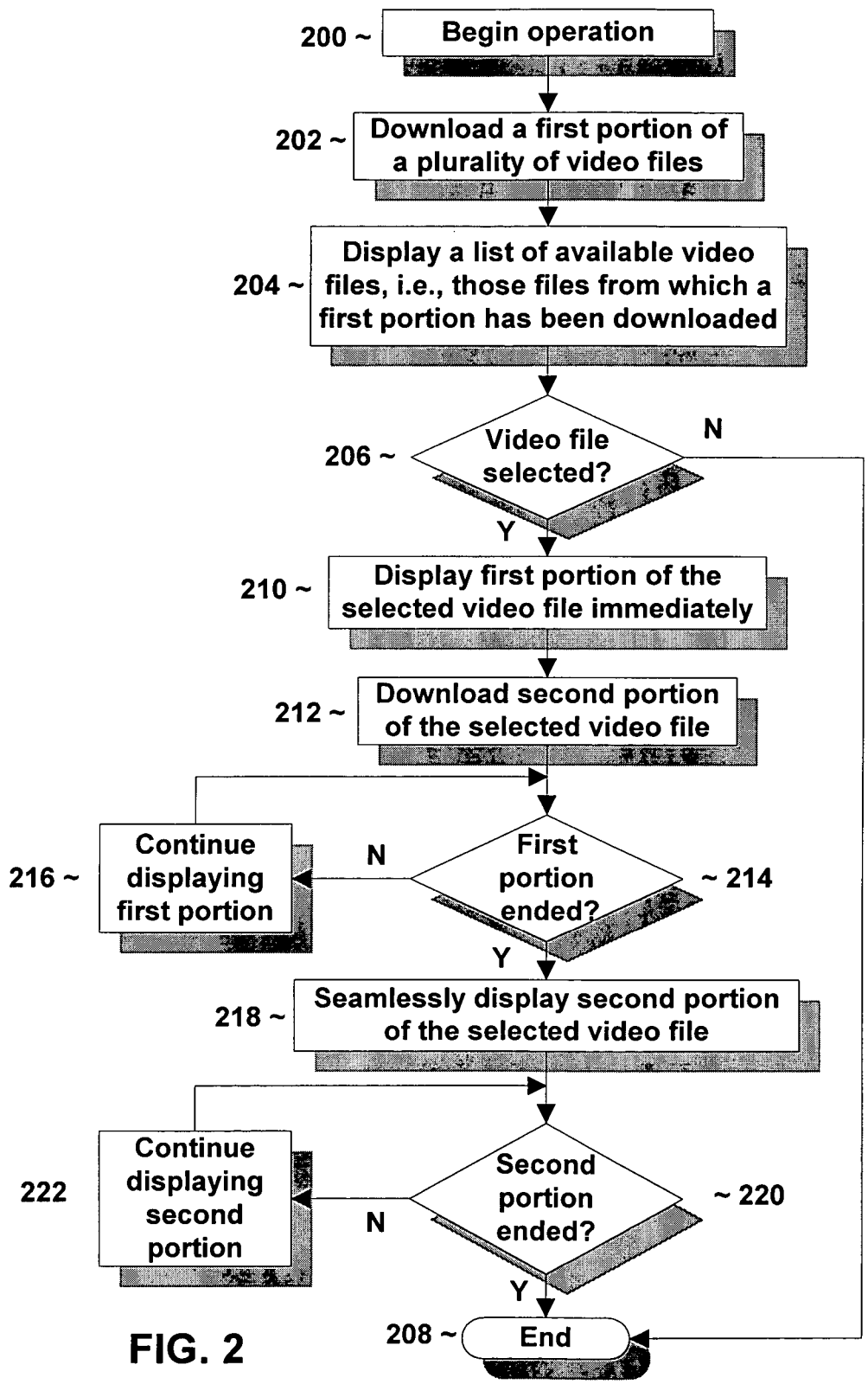
FIG. 2 is a flow chart to illustrate general operating logic that can be used to pre-cache video files at a set top box and broadcast the video files via the entertainment system.

Referring to FIG. 2, a particular embodiment of operating logic of the system 100 (FIG. 1) is shown and commences at block 200 wherein during operation, the following steps are performed: At block 202, a first portion of a plurality of video files are downloaded to the memory 114 (FIG. 1) within the set top box 104 (FIG. 1). Moving to block 204, a list of available video files is displayed. In an illustrative embodiment, the list of available video files includes titles corresponding to each of the video files from which a first portion was downloaded to the memory 114 (FIG. 1). Each of these video files is available for immediate display. At step 206, a determination is made concerning the selection of an available video file. If an available video file is not selected, the logic ends at state 208. On the other hand, if an available video file is selected, the logic proceeds to block 210, and the set top box 104 (FIG. 1) begins transmitting the first portion of the selected video file immediately to the display device 102 (FIG. 1) for display at the display device 102 (FIG. 1).

Proceeding to block 212, while the first portion of the selected video file is being displayed, a second portion of the selected video file is downloaded and stored in the memory 114 (FIG. 1). In an illustrative embodiment, the second portion of the selected video file is the remaining portion of the selected video file to be downloaded. In other words, the first portion and the second portion of the selected video file constitute a complete video file. Moving to step 214, a decision is undertaken in order to determine if the first portion of the selected video file has ended. If not, the method continues to block 216 and the first portion of the selected video file continues to be displayed.

When the first portion of the selected video file ends, the logic proceeds to block 218. At block 218, the second portion of the selected video file is seamlessly displayed at the end of the first portion of the video file. Moving to step 220, a decision is undertaken in order to determine whether the video file has ended. If the video file has not ended, the logic continues to block 222 where the set top box 104 (FIG. 1) continues to display the video file. Conversely, when the video file ends, the logic ends at state 208.

Figure 3:
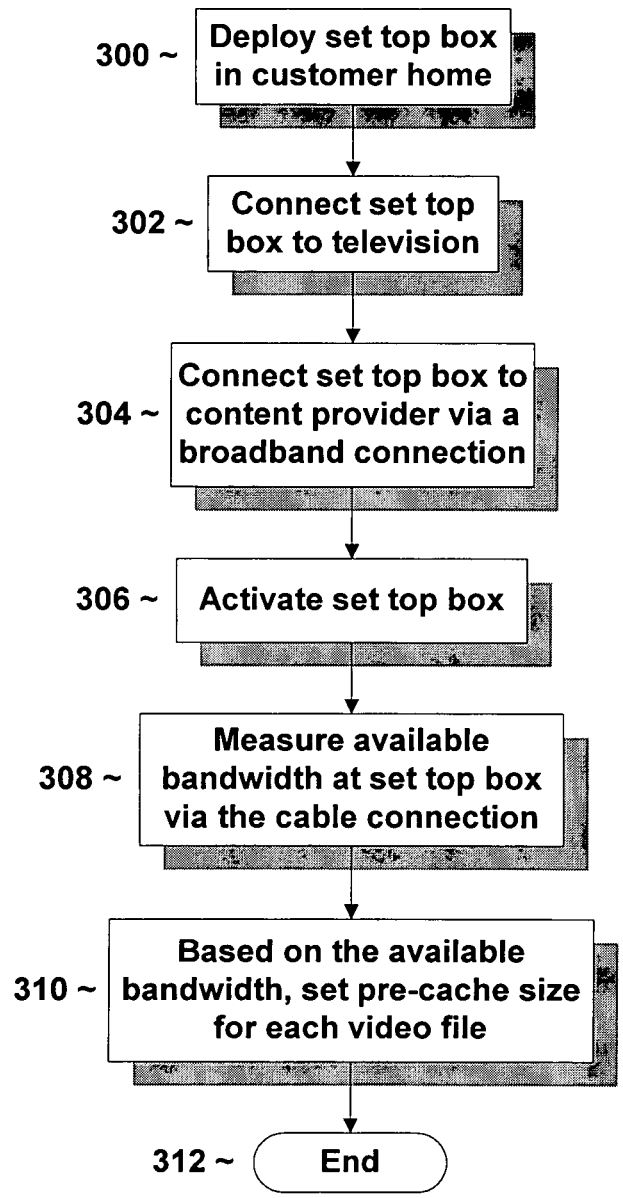
FIG. 3 is a flow chart to illustrate general configuration logic that can be used to determine the number of video files to be pre-cached at the set top box.

FIG. 3 shows a particular embodiment of a method for configuring the set top box. At block 300, the set top box 104 (FIG. 1) is deployed in a customer home. Moving to block 302, the set top box 104 (FIG. 1) is connected to the display device 102 (FIG. 1). The set top box 104 (FIG. 1) can be connected to the content provider via the second broadband connection 108 (FIG. 1). Continuing to block 306, the set top box 104 (FIG. 1) is activated. At block 308, the bandwidth available via the second broadband connection 104 (FIG. 1) is measured by the set top box 104 (FIG. 1). In an illustrative embodiment, the measured available bandwidth is a minimum available bandwidth. However, the measured available bandwidth can be an average available bandwidth measured over a period of time. Next, at block 310, a pre-cache file size is set for each video file based on the available bandwidth measured above. As the measured available bandwidth increases, the pre-cache file size for each video file can be decreased since the remaining portion of each video file to be streamed can be transmitted to the set top box more quickly. Further, as the cache file size decreases, additional video files can be pre-cached within the memory 114 (FIG. 1) of the set top box (FIG. 1). The method ends at state 312.

In an illustrative embodiment, a user can control display of the selected video file while it is playing at the display device 102 (FIG. 1). For example, a user can pause the video file, rewind the video file, stop the video file, and fast-forward the video file. Moreover, when a video file is selected, the set top box 104 (FIG. 1) can delay playing the first portion of the video file, but continue to download the second portion of the video file and add it to the first portion of the selected video file in the memory.

With the configuration of structure described above, the system and method for pre-caching portions of video files, such as movies, on a set top box, allows a significantly larger number of movies to be available for immediate viewing at a display device coupled to a set top box. Thus, a user is provided with a more diverse selection of movies. For example, a conventional set top box may be able to store up to ten movies that are available for immediate viewing. In an illustrative embodiment, the system disclosed herein can store a first portion of up to one hundred movies where each of those one hundred movies available for immediate viewing. Moreover, when a user selects a movie for viewing, he or she can begin watching a first portion the movie immediately, or at least in near real-time, while the remainder of the movie is downloaded in the background. The user sees the cached portion, i.e., the first portion, of the movie first, and by the time the cached portion is complete, more of the movie, e.g., part or all of the second portion, has streamed onto the set top box. Transition from the cached portion to the streaming portion is substantially transparent. From the user's perspective, the movie is displayed as if it was pre-stored entirely on the set top box. The present system and method may be implemented without requiring an increased size of a hard drive and without an increase to the cost of the set top box.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
measuring an available bandwidth of a data connection to a set top box;
dividing a video file into a first portion and a second portion, wherein a size of the first portion of the video file is selected at least partially based on a pre-cache file size associated with the video file, wherein the pre-cache file size is based on the available bandwidth;
downloading only the first portion of the video file over the data connection to a memory in the set top box;
managing a list of video titles corresponding to video files that have only a first portion downloaded;
wherein a total number of video titles on the list of video titles is determined at least partially based on the available bandwidth;
downloading the second portion of the video file from a common source over the data connection while the first portion is being displayed by the set top box at a display device;
in response to detecting an increase in the available bandwidth, decreasing the pre-cache file size associated with the video file and determining a second available bandwidth of the data connection; and
re-apportioning the total number of video titles on the list of video titles based on the second available bandwidth.

2. The method of claim 1, further comprising:
storing a first portion of each of a plurality of video files in the memory within the set top box; and
displaying the list of video titles at the display device.

3. The method of claim 2, further comprising:
detecting a user selection of a particular video title;
accessing the first portion corresponding to the particular video title selected by the user from the memory; and
displaying the first portion at the display device.

4. The method of claim 2, further comprising displaying the second portion of the video file after the first portion has been displayed.

5. The method of claim 1, wherein the available bandwidth is an average available bandwidth over a period of time of the data connection to the set top box.

6. The method of claim 1, wherein the available bandwidth is a minimum available bandwidth of the data connection to the set top box.

7. A device comprising:
a processor;
a computer-readable memory accessible to the processor, the computer-readable memory having instructions to cause the processor to perform operations including:
measuring an available bandwidth of a data connection to the device;
managing a list of video titles, wherein each video title on the list corresponds to a first portion of a respective video file that is available immediately at the device and a second portion of the respective video file that is downloadable from a common source to the device but stored remotely from the device;
wherein a size of the first portion of the respective video file is based on a pre-cache file size associated with the respective video file, wherein the pre-cache file size is based on the available bandwidth, and wherein a total number of video titles on the list of video titles is determined at least partially based on the available bandwidth;
in response to detecting an increase in the available bandwidth, decreasing the pre-cache file size associated with the video file and determining a second available bandwidth of the data connection; and
re-apportioning the total number of video titles on the list of video titles based on the second available bandwidth.

8. The device of claim 7, wherein the operations further include storing the total number of video titles on the list based on the available bandwidth.

9. The device of claim 8, wherein the operations further include:
detecting a particular video title selected by a user from the list of video titles; and
displaying the first portion of the video file that corresponds to the particular video title selected by the user at a display device coupled to the device.

10. The device of claim 9, wherein the operations further include downloading the second portion of the respective video file to the computer-readable memory.

11. The device of claim 7, wherein the available bandwidth is an average available bandwidth.

12. The device of claim 7, wherein the available bandwidth is a minimum available bandwidth over a period of time.

13. A system comprising:
a set top box connectable to a display device, the set top box configured to communicate via a data interface to a remote video content source, the set top box comprising:
a processor; and
a computer-readable medium accessible by the processor, the computer-readable medium including instructions executable by the processor to perform operations including:
measuring an available bandwidth of the data interface;
receiving a first portion of each of a plurality of video files;
storing the first portion of each of the plurality of video files in a memory within the set top box, wherein a size of the memory to store each first portion is determined based on a pre-cache file size associated with at least one of the plurality of video files, wherein the pre-cache file size is based on the available bandwidth;
displaying a list of video titles at the display device, each video title on the list corresponding to a video file having the first portion stored in the memory of the set top box and a second portion that is downloadable from a common source while the first portion is displayed by the set top box at the display device;
in response to detecting an increase in the available bandwidth, decreasing the pre-cache file size associated with the at least one of the plurality of video files and determining a second available bandwidth; and
re-apportioning a total number of video titles on the list of video titles based on the second available bandwidth.

14. The system of claim 13, wherein the operations further include determining the total number of video titles in the list, the total number of video titles at least partially determined based on the available bandwidth.

15. The system of claim 14, wherein the operations further include:
receiving a selected video title via a remote control unit signal; and
displaying a first portion that corresponds to the selected video title.

16. The system of claim 13, wherein the available bandwidth is an average available bandwidth of the data interface.

17. The system of claim 13, wherein the available bandwidth is a minimum available bandwidth of the data interface over a period of time.

18. A method comprising:
    activating a set top box when the set top box is connected to a data interface;
    determining an available bandwidth of the data interface;
    apportioning a segment of a memory within the set top box, wherein a size of the segment of the memory is based on a pre-cache file size associated with a video file to be downloaded to the memory, wherein the pre-cache file size is based on a first available bandwidth, wherein the segment of the memory is configured to store a first portion of the video file, and wherein a second portion of the video file is downloadable from a common source to the set top box via the data interface while the first portion is being displayed by the set top box at a display device;
    in response to detecting a change in the available bandwidth, adjusting the pre-cache file size associated with the video file and determining a second available bandwidth of the data interface;
    apportioning a number of video titles on a list of video titles on the set top box based on the second available bandwidth, wherein the number of video titles on the list of video titles is determined at least partially based on the available bandwidth
    decreasing the pre-cache file size when the available bandwidth increases; and
    increasing a number of video files that have a first portion stored in the segment of the memory after the pre-cache file size has been decreased.

19. The method of claim 18, further comprising:
    connecting the set top box to the display device; and
    displaying the list of video titles, each of the video titles in the list corresponding to one of a plurality of video files having the first portion stored in the segment of the memory and having the second portion stored remotely from the set top box.

20. The method of claim 19, further comprising accessing the first portion of a first video file stored in the segment of the memory in response to a first video title being selected from the list of video titles.

21. The method of claim 20, further comprising displaying the first portion of the first video file on the display device.

22. The method of claim 21, further comprising downloading the second portion of the first video file over the data interface while the first portion is being displayed at the display device.

23. The method of claim 22, further comprising storing the second portion of the first video file in the memory.

24. The method of claim 23, further comprising:
    accessing the second portion of the first video file from the memory; and
    displaying the second portion on the display device after displaying the first portion.

25. The method of claim 18, further comprising re-apportioning the size of the segment of the memory at least partially based on the second available bandwidth.

26. The method of claim 18, wherein the second available bandwidth is an average available bandwidth over a period of time.

27. The method of claim 18, wherein the segment of the memory is configured to store a first portion of each of a plurality of video files.

28. The method of claim 18, further comprising connecting to a content provider via the data interface.

29. The method of claim 18, wherein the available bandwidth is an average available bandwidth of the data interface measured over a period of time.

30. The method of claim 18, wherein the available bandwidth is a minimum available bandwidth of the data interface over a period of time.

31. The method of claim 1, further comprising:
    delaying playback of a selected video file that has a first portion downloaded to the memory; and
    downloading the second portion while playback of the first portion is delayed.

32. The method of claim 1, further comprising decreasing the size of the first portion when the available bandwidth increases.

33. The method of claim 32, further comprising increasing a number of video files that have a first portion stored in the memory when the size of the first portion has been decreased.

* * * * *